(12) United States Patent
Sakoda et al.

(10) Patent No.: US 6,574,283 B1
(45) Date of Patent: Jun. 3, 2003

(54) COMMUNICATION METHOD, TRANSMISSION AND RECEPTION APPARATUSES, AND CELLULAR RADIO COMMUNICATION SYSTEM

(75) Inventors: Kazuyuki Sakoda, Tokyo (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/132,253

(22) Filed: Aug. 11, 1998

(30) Foreign Application Priority Data

Aug. 19, 1997 (JP) .............................. 9-222136

(51) Int. Cl.[7] .............................................. H04L 23/02
(52) U.S. Cl. ...................... 375/262; 375/316; 375/295
(58) Field of Search ................................ 375/252, 130, 375/135, 136, 260, 295, 316, 219; 455/422; 370/206, 207, 208, 209

(56) References Cited

U.S. PATENT DOCUMENTS

| | | | | |
|---|---|---|---|---|
| 4,404,674 A | * | 9/1983 | Rhodes ........................ | 714/793 |
| 5,032,927 A | * | 7/1991 | Watanabe et al. ............ | 386/101 |
| 5,191,576 A | | 3/1993 | Pommier et al. ............. | 370/18 |
| 5,327,462 A | * | 7/1994 | Takahashi et al. ........... | 375/301 |
| 5,341,396 A | * | 8/1994 | Higgins et al. .............. | 375/130 |
| 5,697,083 A | * | 12/1997 | Sano ....................... | 455/276.1 |
| 5,889,815 A | * | 3/1999 | Iwakiri ........................ | 375/148 |

FOREIGN PATENT DOCUMENTS

| | | | |
|---|---|---|---|
| EP | 0498369 | 8/1992 | ............ H04B/3/23 |
| EP | 0782292 | 7/1997 | ............ H04L/1/20 |
| EP | 0793371 | 9/1997 | ......... H04L/27/233 |
| GB | 2291314 | 7/1995 | ............. H04L/5/06 |

OTHER PUBLICATIONS

Simulation and Performance of the Pan–European Land Mobile Radio System, Giovanna D'Aria et al., IEEE Transactions on Vehicular Technology, vol. 41, No. 2, May 1992, pp. 177–189.

CD3–OFDM: A Novel Demodulation Scheme for Fixed and Mobile Receivers, Vittoria Mignone et al., IEEE Transactions on Communications, vol. 44, No. 9, Sep. 1996, pp. 1144–1151.

* cited by examiner

*Primary Examiner*—Chi Pham
*Assistant Examiner*—Kevin M Burd
(74) *Attorney, Agent, or Firm*—Jay H. Maioli

(57) ABSTRACT

A communication method, transmission and a reception apparatuses, and a cellular radio communication system in which waves interfering with a desired wave of a reception signal can be accurately treated as noise includes, a transmitter sorts out part of a signal sequence based on a predetermined combination pattern set between a transmitter and a receiver and orthogonally converts this part before transmitting the signal sequence through a predetermined channel in an information unit, and the receiver receives the signal sequence in the information unit through the same channel and reversely orthogonally converts only the part of the signal sequence that is set to be orthogonally converted by the transmitter and that corresponds to the combination pattern in order to recover the signal sequence. Thus, waves interfering with the destinations desired wave can be accurately treated as noise.

21 Claims, 11 Drawing Sheets

STRUCTURE OF TDMA SLOTS

TRANSMISSION TIMINGS FOR
A TERMINAL TO WHICH TSOS
ARE ASSIGNED

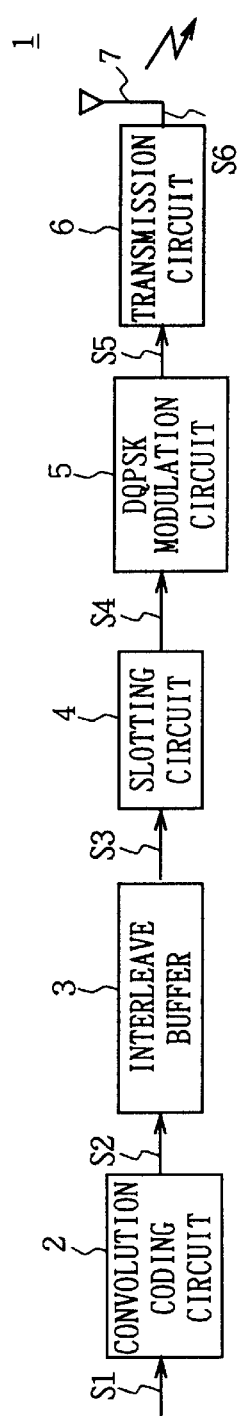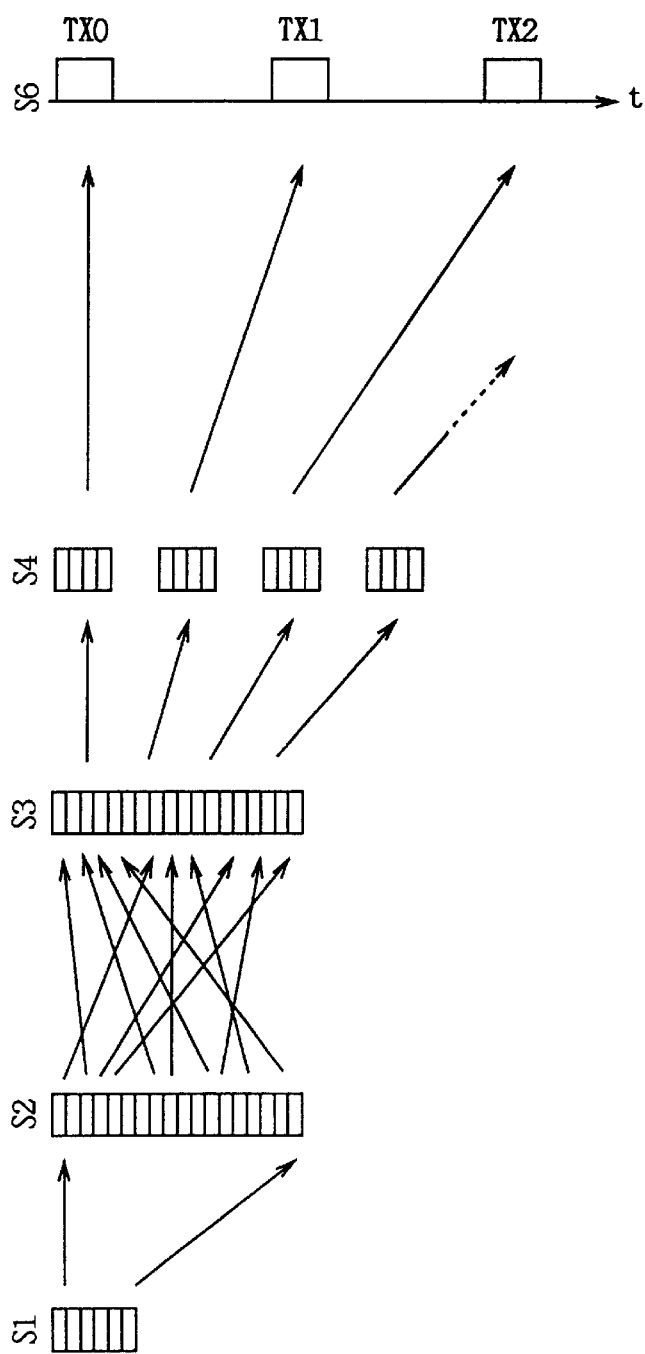
FIG. 2A (PRIOR ART)
FIG. 2B (PRIOR ART)

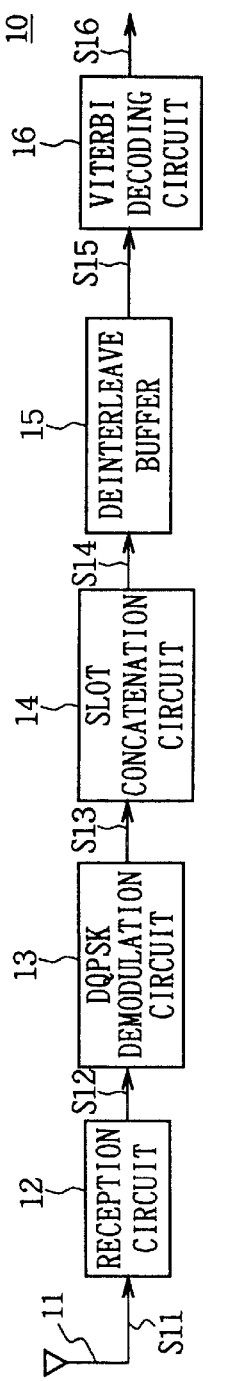
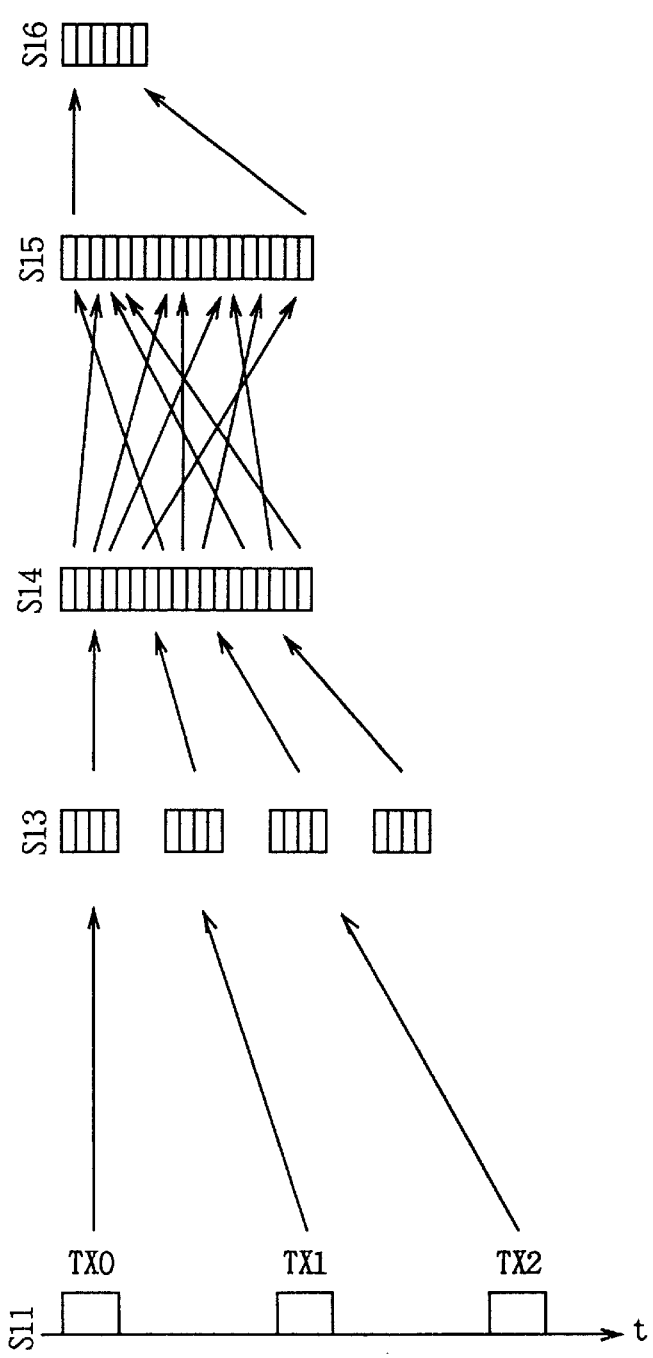
FIG. 3A (PRIOR ART)
FIG. 3B (PRIOR ART)

| SYMBOLS IN ONE SLOT | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| ORTHOGONAL CONVERSION | T | T | N | N | N | T | T | T | T | N | T | T | T | N | N | N | T | T | T | T | N | N | N | N |

FIG. 6

COMMUNICATION METHOD, TRANSMISSION AND RECEPTION APPARATUSES, AND CELLULAR RADIO COMMUNICATION SYSTEM

BACKGROUND OF THE INVENTION

1. Field of the Invention

The present invention relates to a communication method, a transmission apparatus, a reception apparatus, and a radio communication system, which are suitable for application to, for example, a cellular telephone system in which a mobile radio station radio-communicates with a base station that is a fixed radio station.

2. Description of the Related Art

In a conventional radio communication system, an area that is provided communication services is divided into cells of a desired size. A base station that acts as a fixed radio station is installed in the cell, and a cellular telephone that acts as a mobile radio station radio-communicates with the base station in the cell in which that cellular telephone is present. Various methods for communication between a cellular telephone and a base station have been proposed, and a representative one is a Time Division Multiple Access method referred to as TDMA method.

For example, as shown in FIG. 1A, the TDMA method temporally divides a predetermined frequency channel into frames F0, F1, ... of a predetermined time interval while dividing each frame into time slots TS0 to TS3 of a predetermined time interval, and uses this frequency channel to transmit a transmission signal at the timing of the time slot TS0 that is assigned to the station itself. This method enables a plurality of communications to use the same frequency channel (so-called multi-communication), thereby enabling frequencies to be efficiently used. In FIG. 1B and the subsequent drawings, the time slot TS0 assigned for transmission is called a "transmission slot TX", and data blocks sent by a single transmission slot TX is called a "slot".

Transmission and a reception apparatuses for a radio communication system that transmits and receives a digital signal using the TDMA method are described with reference to FIGS. 2 and 3. The transmission and reception apparatuses shown in FIGS. 2 and 3 are mounted in a cellular telephone and a base station in a cellular telephone system, for example, and are used for communications between them.

As shown in FIG. 2A, a transmission apparatus 1 is roughly composed of a convolution coding circuit 2, an interleave buffer 3, a slotting circuit 4, a Differential Quadrature Phase Shift Keying (DQPSK) modulation circuit 5, a transmission circuit 6, and an antenna 7, wherein transmission data S1 to be transmitted is first input to the convolution coding circuit 2.

The convolution coding circuit 2 consists of a predetermined number of shift registers and a predetermined number of exclusive OR circuits, and convolution-codes the input transmission data S1 to output the resulting transmission symbols S2 to the interleave buffer 3. The interleave buffer 3 sequentially stores the transmission symbols S2 in its internal storage. Once the entire storage has been filled with the transmission symbols S2 (a desired amount of transmission symbols S2 have been stored), the buffer 3 randomly changes the order of the transmission symbols S2 (hereafter such a change of order is referred to as "interleaving"). The resulting transmission symbols S3 are output to the slotting circuit 4. The interleave buffer 3 has a sufficient capacity to store a plurality of slots so that transmission symbols are distributed to a large number of transmission slots TX.

To assign the transmission symbols S3 to the transmission slots TX, the slotting circuit 4 rearranges the transmission symbols S3 in slots, and sequentially outputs the slotted transmission symbols S4 to the DQPSK modulation circuit 5. The DQPSK modulation circuit 5 DQPSK-modulates the transmission symbols S4 supplied in slots to generate a transmission signal S5 representing the symbol information as phase values, and outputs them to the transmission circuit 6.

The transmission circuit 6 filters the transmission signal S5 supplied in slots, converts it into an analog signal, and converts the frequency of said analog transmission signal to generate a transmission signal S6 of a predetermined frequency channel. The transmission circuit 6 then amplifies the transmission signal S6 up to a predetermined voltage and outputs said signal to the antenna 7. Thus, the transmission apparatus 1 sends out the transmission signal S6 that has been partitioned into slots, in synchronism with the timing of the transmission slots TX. For reference, FIG. 2B schematically shows the signal processing executed in each circuit of the transmission apparatus 1 described above.

On the other hand, as shown in FIG. 3A, a reception apparatus 10 is roughly composed of an antenna 11, a reception circuit 12, a DQPSK demodulation circuit 13, a slot concatenation circuit 14, a deinterleave buffer 15, and a Viterbi decoding circuit 16. The reception apparatus 10 uses the antenna 11 to receive the transmission signal S6 sent from the transmission apparatus 1, and outputs said signal to the reception circuit 12 as a reception signal S11. The reception circuit 12 amplifies the input reception signal S11, converts the frequency of the reception signal S11 to obtain a baseband signal, and filters said baseband signal. The reception circuit 12 then converts the baseband signal into a digital one to obtain a reception signal S12 that has been DQPSK-modulated, and outputs said signal to the DQPSK demodulation circuit 13.

The DQPSK demodulation circuit 13 DQPSK-demodulates the reception signal S12 to obtain symbol information, and outputs this information to the slot concatenation circuit 14 as reception symbols S13. The reception symbols S13 are not a binary signal having a value of "0" or "1", but a multi-value signal due to noise components added on the transmission path. The slot concatenation circuit 14 concatenates the reception symbols S13 fragmentarily obtained in each slot so that said symbols form continuous signals. Once an amount of reception symbols S13 have been accumulated up to the capacity of the subsequent deinterleave buffer 15, the circuit 14 concatenates said reception symbols S13 and outputs concatenated reception symbols S14 to the deinterleave buffer 15.

The deinterleave buffer 15 has a sufficient capacity to store a plurality of slots. Once the deinterleave buffer 15 has sequentially stored the supplied reception symbols S14, it uses the reverse procedure to that of the interleave buffer 3 on the transmission apparatus 1 in order to change the order of the reception symbols S14 to the original one, and outputs the resultant reception symbols S15 to the Viterbi decoding circuit 16 (hereafter, returning to the original order is referred to as "deinerleaving"). The Viterbi decoding circuit 16 consists of a soft-decision Viterbi decoding circuit. The circuit 16 assumes trellis codes for convolution based on the input reception symbols S15 and selects from all possible data state transitions (so-called maximum likelihood sequence estimation) to recover reception data S16 indicating the transmitted data for output. FIG. 3B schematically shows the signal processing executed in each circuit of the reception apparatus 10 described above.

In the reception apparatus 10, the Viterbi decoding circuit 16 executes the maximum likelihood sequence estimation to recover the reception data S16, but this estimation must be more accurate to more accurately recover the reception data S16.

This is specifically described below. As described above, the reception symbols S13 output from the DQPSK demodulation circuit 13 constitute a multivalue signal. The value of the multi-value signal roughly indicates the reliability of the reception symbols. A Viterbi decoding circuit that decodes such a multi-value signal is called a softdecision Viterbi decoding circuit, and normally recovers data by means of the maximum likelihood sequence estimation taking the reliability of each symbol into consideration. On the contrary, a Viterbi decoding circuit that decodes a binary signal having a value of "−1" or "+1" is generally called a harddecision Viterbi decoding circuit.

The soft-decision Viterbi decoding circuit is assumed to provide more accurate maximum likelihood sequence than the hard-decision Viterbi decoding circuit. This is because the soft-decision Viterbi decoding circuit receives a multi-value signal reflecting the reliability to provide estimation reflecting the reliability.

Thus, to increase the accuracy in the maximum likelihood sequence estimation, the reliability of symbols should be reflected in the signal input to the Viterbi decoding circuit.

In the TDMA method, the received reception symbols are rearranged so as to correspond to each slot prior to transmission, so the communication quality may vary among the slots. Thus, in this case, the reliability indicating the communication quality of each slot should be reflected in the values of the symbols sent in that slot in order to allow the Viterbi decoding circuit to provide more accurate maximum likelihood sequence estimation. In particular, if a large number of slots are interleaved, the communication quality may significantly differ among the slots, resulting in incorrect estimations unless the communication quality is reflected.

However, due to the small number of existing communication methods in which a large number of slots are interleaved, a multi-value signal output from a signal line is directly input to the Viterbi decoding circuit and the communication quality of each slot is not reflected. Thus, in a communication method in which a large number of slots are interleaved, the communication quality of each slot is desirably reflected in the value of a signal input to the Viterbi decoding circuit.

In fact, since the interleaved slots have different receive power due to phasing, if a reception signal from an interference wave source has much higher received power than a reception signal of a desired wave, then the interference wave may be mistakenly received instead of the desired wave, for example, when the timing of multicarrier modulation or demodulation is offset.

In this case, in the DQPSK modulation and demodulation, the transmitter and the receiver are not in synchronism and if the reception of a signal by the receiver is temporally offset, that effect is observed as the rotation of the phase on the frequency axis. If, for example, the reception timing is offset from the modulation timing by $T_A$ [sec], the phase of this signal constantly appears offset on the frequency axis by $2\pi \times T_A$ [rad]/[Hz]. When the frequency band for subcarriers is defined as $f_W$ [Hz] (that is, the minimum modulation time interval required to transmission this signal is defined as $T_m = 1/f_W$ [Hz]) and if the signal received with a timing offset by $T_A$ [sec] is subjected to fast Fourier transformation to differentially demodulate the DQPSK-modulated symbols, a phase offset of $2\pi \times T_A \times f_W$ [rad] is constantly superimposed into each of the QPSK symbols after demodulation.

Thus, in radio communication in a multipath environment that is subjected to delay, even when the timings of transmission and reception are in synchronism, the rotation of the phase on the frequency axis may occur which is substantially equivalent to timing offset if a wave delayed due to the multiple paths has higher received power.

SUMMARY OF THE INVENTION

In view of the foregoing, an object of this invention is to provide a communication method, transmission and reception apparatuses, and a cellular radio communication system in which a wave that interferes with a desired wave in a reception signal can be accurately treated as noise.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2A and 2B are block diagrams showing a configuration of a conventional transmission apparatus;

FIG. 3A and 3B are block diagrams showing a configuration of a conventional reception apparatus;

FIG. 6 is a schematic diagram describing orthogonal conversion;

DETAILED DESCRIPTION OF THE EMBODIMENT

Figures 1A, 1B:
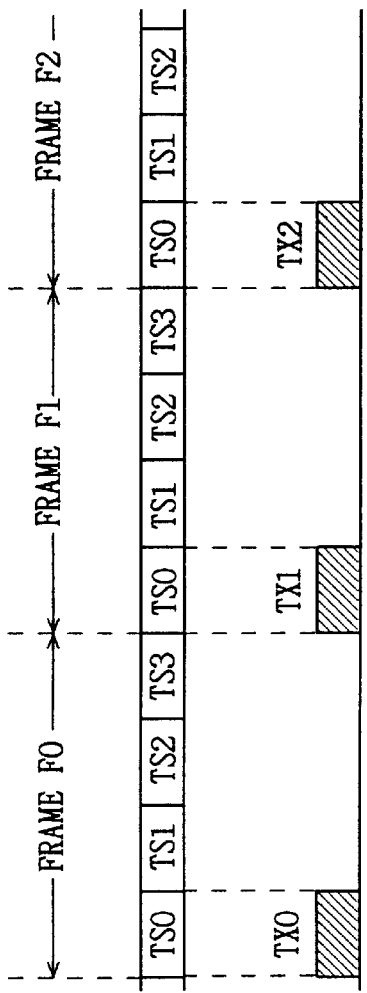
FIG. 1A and 1B are schematic diagrams describing the principle of a TDMA method.
Figure 4:
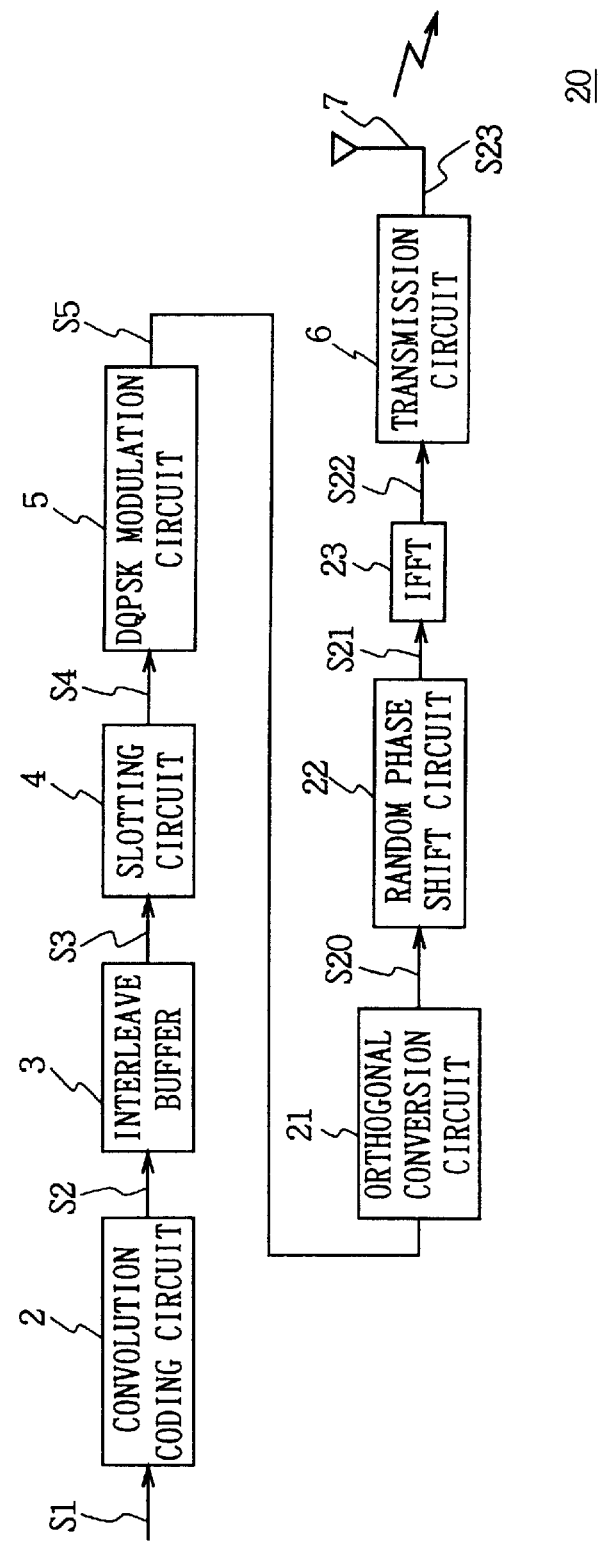
FIG. 4 is a block diagram showing a configuration of a transmission apparatus according to a first embodiment of this invention.

Preferred embodiments of this invention will be described with reference to the accompanying drawings:

The configuration of a radio communication system to which a first embodiment of this invention is applied is described with reference to FIGS. 4 and 5. For example, in a cellular radio communication system, a base and a mobile stations in a cell respectively have a transmission and a reception apparatuses. In FIG. 4 in which the same components have the same reference numerals as in FIG. 2, 20 as a whole denotes a transmission apparatus in a cellular radio communication system for a cellular telephone system, for example. The transmission apparatus 20 has almost the same configuration as the transmission apparatus 1 shown in FIG. 2 except that an orthogonal conversion circuit 21, a random phase shift circuit 22, and an inverse fast Fourier transformation circuit (IFFT) 23 are newly added. In the transmission apparatus 20, the transmission symbols S4 output from the slotting circuit 4 are input to the DQPSK modulation circuit 5. The DQPSK modulation circuit 5 DQPSK-modulates the transmission symbols S4 to generate a transmission signal shown a symbol information by phase values, and in this embodiment, applies $\pi/4$ shift DQPSK modulation (that restricts the maximum phase shift up to $\pm 3\pi/4$ by shifting the phase by $\pi/4$ relative to the preceding symbol).

The DQPSK modulation circuit 5 DQPSK-modulates the transmission symbols S4 to convert the data S4 into the transmission signal sequence S5 of phase data and outputs said sequence S5 to the orthogonal conversion circuit 21.

Furthermore, the orthogonal conversion circuit 21 converts parallel signal sequences obtained by orthogonal conversion into a serial signal in order to convert the grouped transmission signal sequences into a serial signal sequence S20, and then outputs the sequence S20 to the random phase shift circuit 22.

The orthogonal conversion circuit 21 uses a predetermined N-th order normal orthogonal matrix to orthogonally convert a transmission signal sequence. During the transmission, a part of a symbol sequence $X_n$ (n=1, 2, 3, ...) in a parallel transmission signal S5 input from the DQPSK conversion circuit 5 is sorted into groups of N symbols (N is an integer larger than or equal to 1) under the control of an on/off controller 40A. The grouped transmission signal sequence $X_k, \ldots X_{k+N}$ is sequentially multiplied by an N-th order normal orthogonal matrix M for each group as shown in the following equation.

$$\begin{bmatrix} y_k \\ \vdots \\ y_{k+N} \end{bmatrix} = M \begin{bmatrix} x_k \\ \vdots \\ x_{k+N} \end{bmatrix} \quad (1)$$

Thus, the part of the symbol sequence is orthogonally converted to obtain a symbol sequence $y_n$ (n=1, 2, 3, ...). In the following description, the normal orthogonal matrix is in second order and the number (n) of symbols to be grouped is two for explanation.

Specifically, to execute orthogonal conversion, the orthogonal conversion circuit 21 uses two adjacent symbols $x_0$, $x_1$ and the following equations for orthogonal conversion.

$$y_0 = 1/\sqrt{2}(x_0 + x_1) \quad (2)$$

$$y_1 = 1/\sqrt{2}(x_0 - x_1) \quad (3)$$

In this manner, symbols $Y_0$, $Y_1$ after orthogonal conversion are calculated.

As for a combination pattern indicating whichever symbols in a transmission symbol sequence input to the orthogonal conversion circuit 21 are orthogonally converted or not, a control section of a base station in a cellular radio communication system sets a random combination pattern in such a way that each base station has a different peculiar combination pattern, and transmits it own combination information to each mobile station to make the transmitter and receiver mutually compatible.

As to the illustrative combination pattern which indicates whether orthogonal conversion is to be provided or not as shown in FIG. 6, for example, when 24 symbols in one slot are sent during one modulation time, T designates a symbol that is combined with an adjacent symbol for orthogonal conversion, while N designates a w symbol that is not orthogonally converted. In this case, half the symbols, that is, 12 symbols are orthogonally converted.

The receiver reversely orthogonally converts the symbol sequence that has been orthogonally converted by the transmitter based on the combination information, thereby enabling the orthogonally converted symbol sequence to be recovered. If a reception apparatus that is not involved in the communication reversely orthogonally converts the reception signal, the original signal cannot be recovered unless the sequence matches the symbol sequence that has been orthogonally converted by the transmitter. Thus, by using the combination pattern that varies among the base stations in order to orthogonally convert the transmission symbols in each slot, signals of irrelevant transmitters can be apparently treated as noise even if waves from the transmitters interfere with one another.

Figure 7:
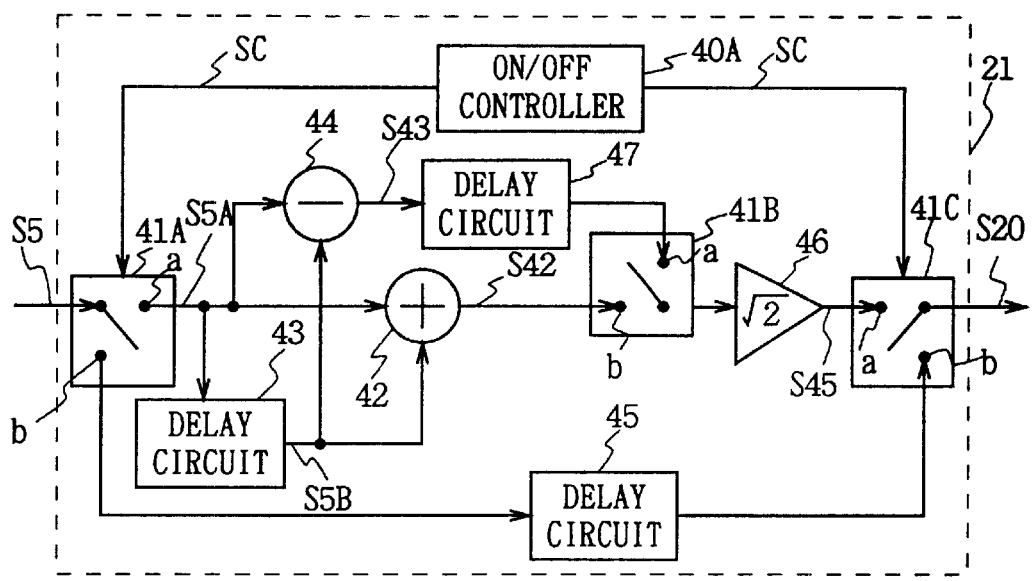
FIG. 7 is a circuit diagram showing a configuration of an orthogonal conversion circuit in the transmission apparatus.

The configuration of the orthogonal conversion circuit 21 is specifically described with reference to FIG. 7. The orthogonal conversion circuit 21 determines whether the transmission symbols S5 input from the DQPSK modulation circuit 5 are to be orthogonally converted or not, by operating a switch 41A under the control of the on/off controller 40A based on the combination information communicated from the base station. That is, to orthogonally convert the transmission symbols S5, the on/off controller 40A places the switch 41A on the (a) side to output said symbols S5 to a adder 42, a delay circuit 43, and a subtracor 44, whereas to avoid converting the transmission symbols S5 orthogonally, the on/off controller 40A places the switch 41A on the (b) side to output them to a delay circuit 45.

The transmission symbols S5 that have been output to the delay circuit 45 through the switch 41A are sent out to a switch 41C. The switch 41C as well as the switch 41A is controlled by the on/off controller 40A based on the combination information. When the transmission signals S5 are output from the delay circuit 45, the switch 41B is placed on the (b) side to prevent the orthogonal conversion circuit 21 from providing orthogonal conversion in order to output the transmission symbols S5 that have been subjected to only a predetermined delay, to the random phase shift circuit 22.

On the other hand, when the on/off controller 40A places the switch 41A on the (a) side, the transmission symbols S5 are transmitted to the adder 42, delay circuit 43, and subtractor 44. The delay circuit 43 temporarily stores the first transmission symbol transmitted S5A. When the next transmission symbol S5B is input to the adder 42 through the switch 41A, the transmission symbol S5A stored in the delay circuit 43 is output to the adder 42, where the transmission symbols S5A and S5B are added together to obtain a transmission symbol S42.

Furthermore, the adder 42 outputs the symbol to a a $\sqrt{2}$ circuit 46 via the switch 41B, which amplifies the transmission symbol S42 by $\sqrt{2}$ a times to provide the orthogonal conversion shown in Equation (1). The resulting transmission symbol S20 is output to the subsequent random phase shift circuit 22 via the switch 41C.

On the other hand, the subtractor 44 subtracts the transmission symbol S5B delayed by one time interval from the transmission symbol S5A input at a predetermined timing so as to obtain a transmission signal S43. The transmission signal S43 is output to the √2 circuit 46 via the switch 41B after the output of the adder 42. The √2 circuit 46 amplifies the amplitude of the transmission symbol S43 by √2 times to provide the orthogonal conversion shown in Equation (2), and outputs the resultant transmission symbol S20 to the subsequent random phase shift circuit 22 through the switch 41C.

The DQPSK-modulated symbol sequence output from the DQPSK modulation circuit 5 is output from the orthogonal conversion circuit 21 as the transmission symbol S20. Said DQPSK modulation circuit 5 is a new symbol sequence. A half of which is orthogonally converted for each slot and which is then input to the random phase shift circuit 22. The random phase shift circuit 22 further applies random phase sequence multiplication to the symbol sequence of the transmission symbol S20.

The random phase shift circuit 22 randomly varies the phase of the transmission symbol S20 by sequentially multiplying the phase data for each symbol generated randomly from the input transmission symbol S20.

Figure 8:
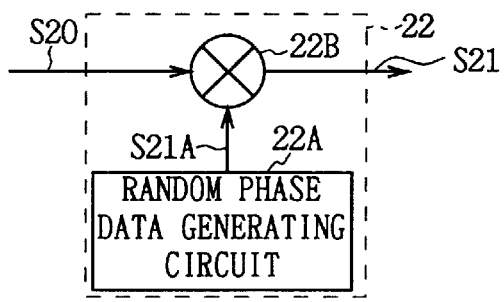
FIG. 8 is a circuit diagram showing a configuration of a random phase shift circuit in the transmission apparatus.

As shown in FIG. 8, the random phase shift circuit 22 is composed of a random phase data generating circuit 22A and a multiplier 22B. The random phase data generating circuit 22A has different initial phase values for each communication channel (for example, for each base station in a cellular telephone system) to sequentially generate a random phase value starting with the initial phase value based on a predetermined rule. The random phase data generating circuit 22A outputs phase data S21A indicating the phase value to the multiplier 22B. The phase data S21A is a complex sequence having a random phase value and an amplitude of "1". The multiplier 22B sequentially multiplies the complex sequence in the input transmission signal S20 by the complex sequence in the phase data S21A to randomly vary the phase of the transmission symbol S20. Thus, a transmission signal S21 whose phase has been randomly varied by the different phase offset sequence for each communication channel is output to the inverse fast Fourier transformation circuit 23.

If such a random phase shift is executed, the receiver has the same initial phase values as described above and can recover the signal before executed the random phase shift by using the same procedure to generate the same phase data as in the transmitter, and by dividing a reception signal by generated data for recovery. If a reception apparatus that is not involved in the communication receives the transmission signal subjected to the random phase shift, it cannot recover the original signal due to the lack of the same initial phase value. Thus, by using different initial phase value for each communication channel, even if each communication channel becomes an interfering wave mutually, signals from irrelevant transmitters, that is, all interference waves have a random phase and can be apparently identified as half noise.

Thus, by applying randomness in the amplitude direction to transmission symbols with orthogonal conversion and also applying the phase offset to the transmission symbols with the random phase shift, the possible constellation points of reception signals can be increased.

The transmission signal S21 subjected to the random phase shift in the above described manner is output to the subsequent inverse fast Fourier transformation circuit 23.

The inverse fast Fourier transformation circuit 23 respectively applies inverse Fourier transformation to each symbol constituting a symbol group of the transmission signal S21 to distribute the symbols to the 24 subcarriers described above for superimposing (each symbol in the group of transmission symbols S21 is placed on the frequency axis for transmission). As a result, a signal in which the input group of symbols arranged on the frequency axis is generated from the input group of symbols arranged on the time axis.

The inverse fast Fourier transformation circuit 23 also windows a group of transmission symbols S22 generated by the inverse Fourier transformation in order to restrain unwanted out-band spurious. A specific windowing method is to apply cosine rolloff filtering on the time axis to the group of transmission symbols S22. Thus, the group of transmission symbols S22 generated by such processing by the inverse fast Fourier transformation circuit 23 is output to the subsequent transmission circuit 6.

The transmission circuit 6 filters the group of transmission symbols S22 and then applies digital-to-analog conversion processing to them so as to generate a transmission signal. Then, the transmission circuit 6 generates a transmission signal S23 of the predetermined frequency channel by converting the frequency of the transmission signal, and amplifies the signal up to the predetermined voltage, and thereafter transmits said signal via the antenna 8. The transmission circuit 6 is designed to perform frequency hopping (FH), that is, to randomly vary the frequency channel used for each slot based on the predetermined pattern, thereby reducing the effect of interference waves from other communication.

Thus, the transmission apparatus 20 distributes the group of coded bits sorted in slots to a plurality of subcarriers for superimposing, thereby providing multicarrier communication in which an information bit sequence for transmission is transmitted with the plurality of subcarriers.

Figure 5:
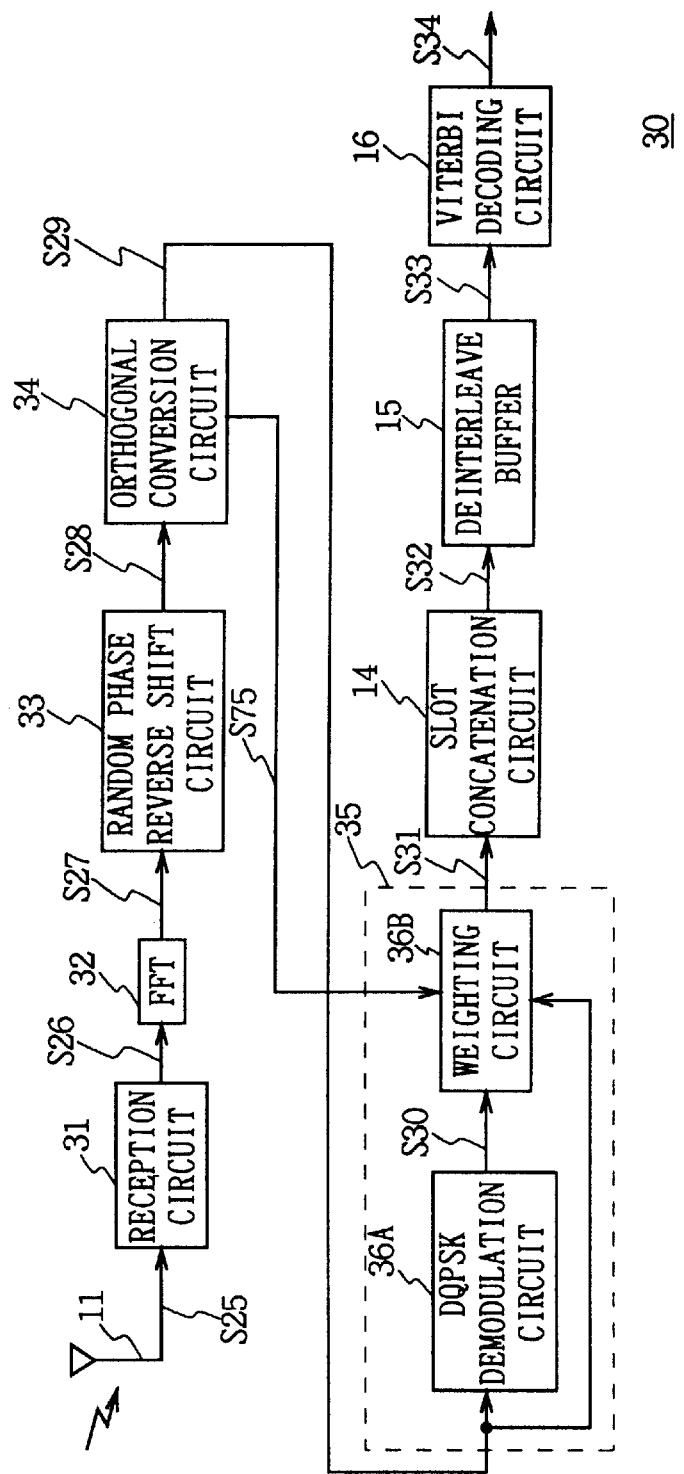
FIG. 5 is a block diagram showing a configuration of a reception apparatus according to a first embodiment of this invention.

As shown in FIG. 5 in which the same components have the same reference numerals as in FIG. 3, the reception apparatus 30 is roughly composed of an antenna 11, a reception circuit 31, a fast Fourier transformation circuit (FFT) 32, a demodulation circuit 35, a slot concatenation circuit 14, a deinterleave buffer 15, and a Viterbi decoding circuit 16. The reception circuit 31 has almost the same configuration as the reception apparatus 10 shown in FIG. 3 except that the fast Fourier transformation circuit 32, a random phase reverse shift circuit 33, and an orthogonal conversion circuit 34 are added, and that the processes executed by the reception circuit 31 and the decoding circuit 35 are changed.

Firstly, the antenna 11 receives a transmission signal S23 transmitted from the transmission apparatus 20, and inputs said signal to the reception circuit 31 as a reception signal S25. The reception circuit 31 amplifies the input reception signal S25, and then converts the frequency of the reception signal S25 to obtain a baseband signal. The reception circuit 31 applies analog-to-digital conversion to the baseband signal after the filtering process to obtain a group of reception symbols S26, and outputs said group to the fast Fourier transformation circuit 32.

When outputting the group of reception signal S26, the analog-to-digital conversion circuit of the reception circuit 31 amplifies the group of reception signal S26 in such a way that powers of every slot become constant. In case of this radio communication system, as a signal is transmitted in slots, each slot could be subjected to the different fading or the like through the transmission path respectively, so that signal powers could be different in each slot.

In addition, the reception circuit 31 changes the frequency channel for reception based on the same pattern as in the transmitter. So even if the transmitter changes the frequency channel, the circuit 31 can follow the transmitter side to perform an accurate receiving operation.

The fast Fourier transformation circuit 32 windows the input group of reception signals S26 to obtain signal components for one slot, and applies Fourier transformation to the signal components. This operation enables the group of symbols arranged on the frequency axis to be rearranged on the time axis. A group of reception symbols S27 obtained after the Fourier transformation is input to the subsequent random phase reverse shift circuit 33. The fast Fourier transformation circuit 32 as well as the inverse fast Fourier transformation circuit 23 in the transmitter applies cosine rolloff filtering to the group of reception symbols S27 on the time axis for windowing.

Figure 9:
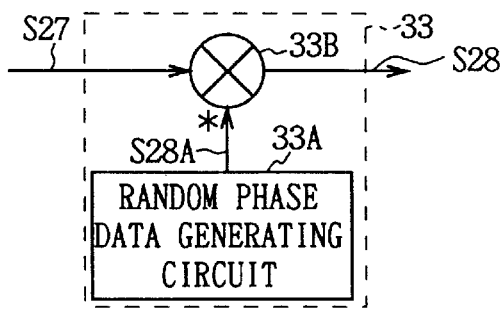
FIG. 9 is a circuit diagram showing a configuration of a random phase shift circuit in the reception apparatus.

The random phase reverse shift circuit 33 sequentially divides the input reception signal S27 by the phase data which indicates the same phase value as in the transmitter in symbols to cancel the random phase shift applied to the reception signal S27. In this case, as shown in FIG. 9, the random phase reverse shift circuit 33 is practically composed of a random phase data generating circuit 33A and a multiplier 33B. The random phase data generating circuit 33A having the same initial phase value as in the transmitter, sequentially generates the same phase value as in the transmitter starting with the initial phase value, and outputs phase data S28A indicating a phase value that is conjugated with the first phase value (in the figure, "*" indicates conjugate) to the multiplier 33B. The phase data 33 is a complex sequence having phase values conjugated with the phase values generated in the transmitter and having an amplitude of "1". The multiplier 33B sequentially multiplies the complex sequence in the input reception signal S27 by the complex sequence in the phase data S28A for each symbol to cancel the phase shift applied to the reception signal S27 in order to obtain the original phase state. In this manner, by using the phase data S21A conjugated with the phase data of the transmitter, the multiplier 33B can be used instead of a divider to provide reverse phase shift.

In this way, a reception signal S28, the phase of which has been restored to its original state by the random phase reverse shift circuit 33 is input to the subsequent orthogonal conversion circuit 34.

Figure 10:
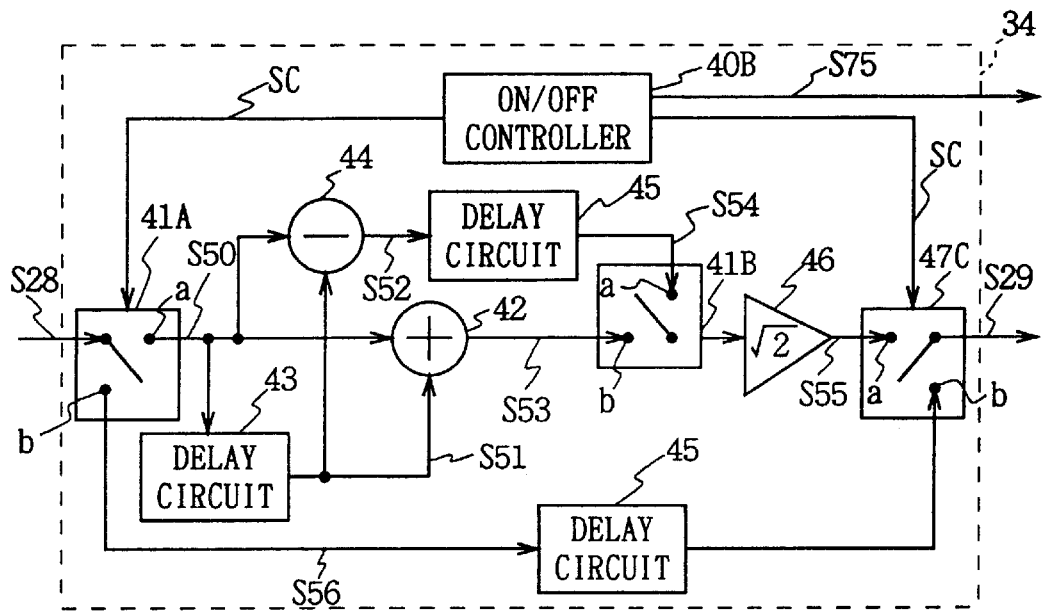
FIG. 10 is a circuit diagram showing a configuration of an orthogonal conversion circuit in the reception apparatus.

As shown in FIG. 10, the orthogonal conversion circuit 34 of F the reception apparatus 30 has almost the same configuration as the orthogonal conversion circuit 21 of the transmission apparatus 20 so that predetermined symbols in the group of reception symbols S28 are reversely orthogonally converted under the control of the on/off controller 40B. In this case, the transmitter 20 communicates an information of a combination pattern of the symbols for orthogonal transformation at the transmission side to the reception apparatus 30 beforehand, so that the orthogonal conversion circuit 34 reversely orthogonally converts only the symbols that have been orthogonally converted by the transmitter. The orthogonal conversion circuit 34 applies the same orthogonal conversion as in the orthogonal matrix M in the orthogonal conversion circuit 21 to reception symbols $y_0$, $y_1$, by providing reverse orthogonal conversion in order to recover the original signal symbol.

Only a part of the input reception signal S28 that hasbeen orthogonally converted under the control of the on/off controller 40A of the orthogonal conversion circuit 21 is orthogonally converted as in the orthogonal conversion circuit 21 to extract the original DQPSK-modulated reception signal S29 from the transmission symbols orthogonally converted at the transmission side. The orthogonal conversion circuit 34 of the reception apparatus 30 divides the symbol sequences of the reception signal S28 received from the random phase reverse shift circuit 33 into groups of two symbol sequences. The on/off controller 40B sorts out a reception signal sequence $y_0$, $y_1$ out of the groups of the symbol sequences, that has been orthogonally converted by the orthogonal conversion circuit 21 of the transmission apparatus 20. The on/off controller 40B sequentially multiplies the sorted reception signal sequence $y_0$, $y_1$ by a reverse matrix $M^{-1}$ of the second-order normal orthogonal matrix M used by the transmitter for each group.

$$\begin{bmatrix} x_0 \\ x_1 \end{bmatrix} = M^{-1} \begin{bmatrix} y_0 \\ y_1 \end{bmatrix} \qquad (4)$$

In this manner, the signal sequence $x_0$, $x_1$ before executed the orthogonal conversion is recovered. The orthogonal conversion circuits 21 and 34 have the same circuit configuration. Thus, they recover the signal sequence by using the orthogonal matrix M to reversely orthogonally convert the symbols that have been orthogonally converted by using the orthogonal matrix M. In this case, the orthogonal conversion circuit 34 outputs symbol conversion information S75 indicating whether the transmission symbols that were orthogonally converted at the transmission side have been orthogonally converted or not, to a weighting circuit 36B in the demodulation circuit 35 via the on/off controller 40B.

Figure 11:
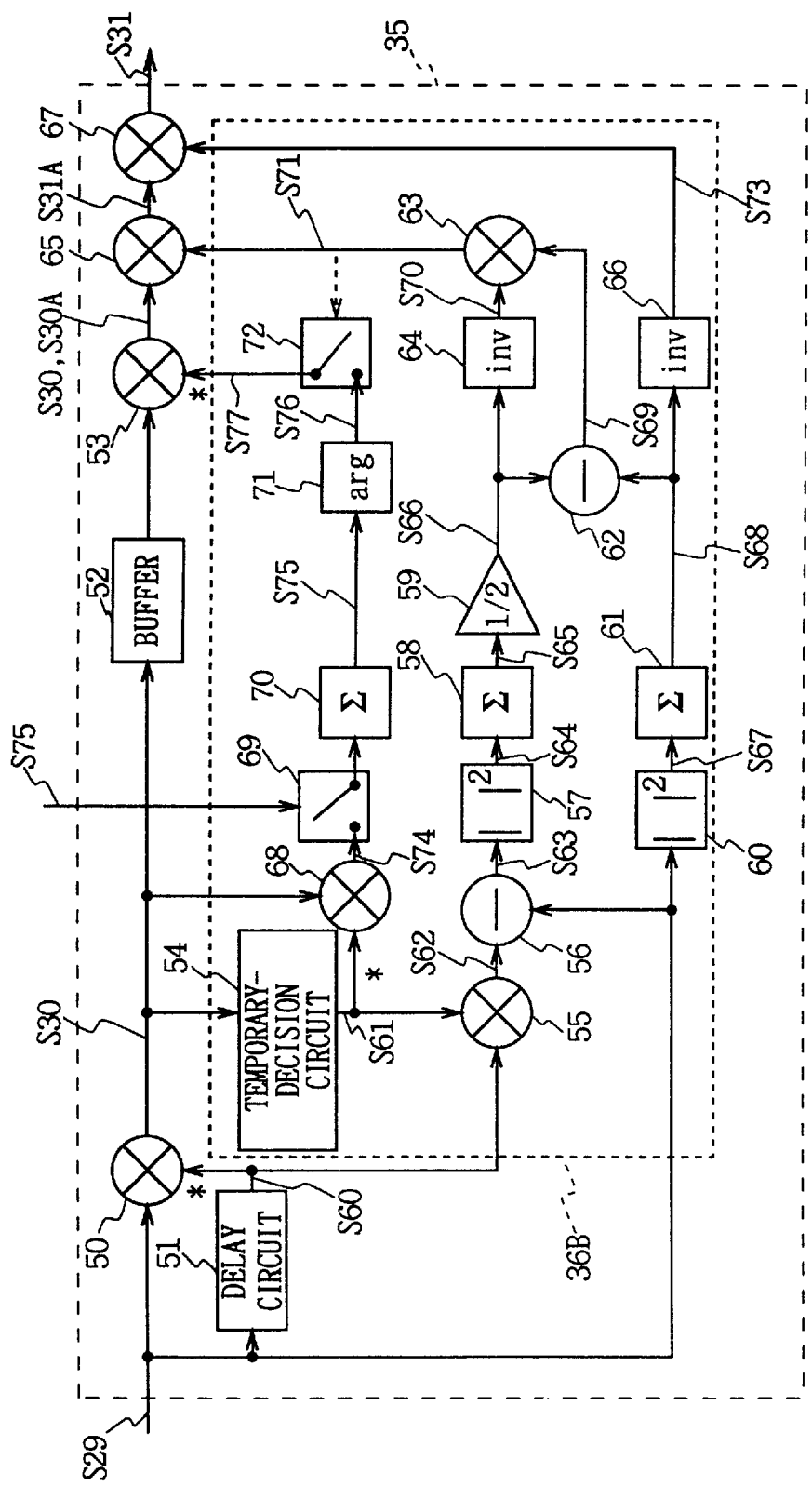
FIG. 11 is a circuit diagram showing a configuration of a demodulation circuit in the reception apparatus according to the first embodiment.

The configuration of the demodulation circuit 35 is specifically explained with reference to FIG. 11. The demodulation circuit 35 is input the reception signal S29 consisting of a complex signal supplied from the orthogonal conversion circuit 34, to a multiplier 50 and a delay circuit 51 constituting the DQPSK demodulation circuit 36A. The multiplier 50 receives a reception signal S60 delayed by one symbol from the delay circuit 51, and complex-multiplies the input reception signal S29 into the conjugate value of the reception signal S60 which is one symbol before the input reception signal S29, and thus the multiplier 50 extracts reception symbols S30 from the reception signal S29.

However, the reception symbols S30 have symbol information that has been DQPSK-modulated. The reception symbols S30 are then input to a subsequent first-in first-out buffer (hereafter referred to as a "FIFO buffer") 52, where said reception symbols S30 are sequentially stored. The FIFO buffer 52 holds the reception symbols S30 until said stored symbols are accumulated up to one slot, and after that, output them to a subsequent multiplier 53.

The reception symbols S30 extracted by the multiplier 50 are input to a temporary decision circuit 54 in a weight coefficient calculating section 36B. The temporary decision circuit 54 temporarily determines which state out of the five phase states of QPSK the reception symbols S30 are in, and outputs a complex signal S61 indicating the temporarily determined phase state and having an amplitude of "1" to a multiplier 55.

A reception signal S60 that is output from the delay circuit 51 is input to the multiplier 55. The multiplier 55 multiplies a complex signal S61 from the temporary decision circuit 54 by the reception signal S60 delayed by one symbol to generate a DQPSK-modulated signal based on the result of the temporary determination, that is, a reception signal S62 that reproduces the reception signal S29. In the following description, the reception signal S62 is referred to a "replica reception signal" distinguished from the original reception signal S29.

The replica reception signal S62 generated by the multiplier 55 is subsequently input to a substrator 56. The original reception signal S29 is also input to the subtractor 56. So the subtractor 56 subtracts the replica reception signal S62 from the original reception signal S29, and outputs a signal component S63 consisting of the result of the subtraction to a first square circuit 57. In this case, if the result of a decision by the temporary decision circuit 54 is correct, the signal component S63 constitutes a combination of the noise components contained in the reception signal S29 at the temporary decision, and the noise components contained in the preceding reception signal S29 that precedes the reception signal S29 at the temporary decision by one symbol.

The first square circuit 57 squares the amplitude of the signal component S63 for each symbol to obtain a power of the noise component in each symbol, and outputs an obtained noise power S64 to a first addition circuit 58. For DQPSK modulating/demodulating, the first addition circuit 58 accumulatively adds the noise power S64 for all the symbols output from the first square circuit 57 except for the leading symbol, so as to obtain a noise power S65 for one slot that equals to the sum of the noise power in all the symbols constituting one slot. In this case, since the noise power S65 is double the noise component power in one slot, its signal power is reduced to the half via a half circuit 59 to obtain a noise power S66. And then, the noise power S66 is output to a subtractor 62. Thus, by detecting the noise power S66 in the reception symbol from the transmission symbol that has been subjected to orthogonal conversion and random phase shift, the noise component can be detected more accurately.

In addition, the reception signal S29 supplied from the random phase reverse shift circuit 33 is directly input to a second square circuit 60 in the weighting circuit 36B without DQPSK demodulation. The second square circuit 60 squares the amplitude of the reception signal S29 to obtain a power of the reception signal S29 for each symbol, and then outputs the obtained signal power S67 to a second addition circuit 61. The second addition circuit 61 accumulatively adds the signal power S67 for each symbol output from the second square circuit 60 to obtain a signal power S68 for one slot that equals to the sum of the signal power in all the symbols constituting one slot. The second square circuit 60 then outputs the signal power S68 to a subtractor 62. The signal power S68 indicates the signal power of the reception signal S29, and is a combination of the power in the actual signal component and the power in the noise component.

The subtractor 62 subtracts the noise power S66 input from the first addition circuit 58 via the half circuit 59 from the signal power S68 of the reception signal S29 input from the second addition circuit 61 in order to obtain a signal power S69 of the desired signal, and then outputs the desired signal to a multiplier 63. The multiplier 63 multiplies the signal power S69 by the inverse S70 of the noise power S66 calculated by an inverse calculating circuit 64 in order to generate a signal-to-noise power ratio (SNR) in one slot, and outputs it to a multiplier 65 as a weight coefficient S71 indicating the reliability of one slot. The multiplier 65 multiplies the weight coefficient S71 by the reception symbol S30 output from the FIFO buffer 52 in order to reflect the reliability of the slot on the amplitude of the reception symbol S30. Thus, this processing generates a reception symbol S31A reflecting the reliability of the slot.

Furthermore, if the reception circuit 31 insufficiently regulates the signal power of the slot, the demodulation circuit 35 outputs the signal power S68 output from the second addition circuit 61 to an inverse calculating circuit 66 in order to calculate the inverse S73 of the signal power S68, and outputs it to a multiplier 67. Consequently, the multiplier 67 can multiply the inverse S73 by the QPSK signal (the reception symbol S31A) output from the FIFO buffer 52 via the multiplier 65 so as to normalize the signal power.

In addition, if a phase offset corresponding to a delay caused by a reception timing offset is superimposed on the DQPSK symbol output from the multiplier 50, the demodulation circuit 35 executes processing for removing this phase offset.

In this case, the multiplier 68 multiplies the differentially amplified reception symbol S30 output from the multiplier 50 by the conjugate complex signal S61 from the temporary decision circuit 54 in order to generate a symbol S74 having a "zero" phase component obtained by information modulation. The symbol S74 is input to a third addition circuit 70 via a switch 69.

The on/off controller 40A in the orthogonal conversion circuit 34 inputs symbol conversion information S75 indicating whether the reception symbol S29 input to the demodulation circuit 35 has been orthogonally converted or not, to the switch 69. In response to the symbol conversion information S75, the switch 69 is controlled so that only such reception symbol sequences that have not been orthogonally converted by the orthogonal conversion circuit 34, are passed, and so that only such reception symbols S74 that have not been orthogonally converted are output to the third addition circuit 70. The third addition circuit 70 accumulatively adds the input reception symbols S74 together, and after finishing processing for one slot, the third addition circuit 70 outputs the result of the accumulative addition to an amplitude normalization circuit (arg) 71. The arg 71 holds the phases of the reception symbols S29 in complex values to generate an average S76 of the phase components having an amplitude of "1", and outputs it to the multiplier 53. Thus, since the arg 71 detects a phase offset in those reception symbols S74 which have not been orthogonally converted, the phase offset in reception signals can be accurately detected for each slot.

The multiplier 53 multiplies an average S77 of the phase components by the reception symbol S30 output from the FIFO buffer 52 to generate a reception signal S30A with this multiplication between the reception symbol S30 and its conjugation. With this processing, the demodulation circuit 35 can detect the phase offset in reception symbols to compensate for them.

In this case, the switch 72 is turned on if the SNR of the reception symbol, that is, the value of the weight coefficient S71 output from the multiplier 63 is larger than a predetermined threshold, while said switch 72 is turned off if the value of the weight coefficient S71 is smaller than or equal to the predetermined threshold, that is, the SNR of the reception signal is low. For example, when the SNR of the reception signal is lower than 10 [dB] (a value of about 10 [dB] is preferable as the threshold of the SNR), the phase offset value output from the arg 71 is not very reliable nor very effective to attempt to remove the phase offset by using the phase offset value output from the arg 71, so that the switch 72 is turned off. Thus, since the phase offset is calibrated by using the weight coefficient S71 only when the SNR is high, the phase offset can be accurately canceled in response to the SNR of the reception symbol.

Furthermore, the multiplier 53 outputs the reception signal S30A to a multiplier 65. The multiplier 65 multiplies the reception signal S30A by the weight coefficient S71 output from the multiplier 63 to reflect the reliability of the slot on the amplitude of the reception signal S30A. Thus, this processing enables the phase offset to be removed from the reception signal S30A and further enables the reception symbol S31A to reflect the reliability of the slot.

The reception signal S31A is output to the multiplier 67. The multiplier 67 can generate normalized reception symbols S31 by multiplying an inverse S73 by the reception signal S31A in which the phase offset output via the multipliers 53 and 65 has been removed and which reflects the reliability of the slot.

Thus, the reception symbol S31 output to the slot concatenation circuit 14 from the demodulation circuit 35 is weighted in response to the reliability of the receive slot. Further, the phase offset, if any, is removed from the reception symbol S31. This function significantly increases the accuracy in maximum likelihood estimation provided by the subsequent Viterbi decoding circuit 16.

The slot concatenation circuit 14 that follows the demodulation circuit 35 concatenates the reception symbols S31 fragmentarily obtained in slots so as to be a continuous signal. The slot concatenation circuit 14 concatenates the reception symbols S31 when the reception symbols S31 are accumulated up to the amount equaling to the storage capacity of the subsequent deinterleave buffer 15, and outputs concatenated reception symbols S32 to the deinterleave buffer 15. The deinterleave buffer 15 has a sufficient capacity to store a plurality of slots, and after storing the supplied reception symbols S32 in its internal storage, uses a reverse procedure to that used by the interleave buffer 3 of the transmission apparatus 20 in order to change the order of the reception symbols S32. The deinterleave buffer 15 thus recovers the symbols S32 to their original order, and outputs the resulting reception symbols S33 to the Vierbi decoding circuit 16.

The Viterbi decoding circuit 16 comprising a soft-decision Viterbi decoding circuit applies maximum likelihood sequence estimation to the input reception symbols S33 to recover the reception data S34 indicating the transmitted data. In this case, the preceding weighting circuit 36B calculates the reliability of the slot in which the reception symbols S29 have been sent, and multiplies the reception symbols S29 by the weight coefficient indicating the reliability of the slot. Accordingly, the signal level of the reception symbols S33 input to the Viterbi decoding circuit 16 corresponds to the reliability of the slot. Therefor, even if the communication quality varies among the slots, it is reflected in the signal level with the reliability. Consequently, by inputting such reception symbols S33 to the Viterbi decoding circuit 16, the Viterbi decoding circuit 16 executes maximum likelihood sequence estimation with taking the reliability of each slot into account. Thereby, the accuracy in maximum likelihood sequence estimation can be increased and the reception data can be recovered more accurately.

According to the above described configuration, during transmission in this radio communication system, after the signal sequence is convolution-coded, interleaved, slotted, and then DQPSK-modulated, the orthogonal conversion circuit 21 orthogonally converts half of the symbols in each slot in the signal sequence under the control of the on/off controller 40A based on the converted-symbol combination patterns predetermined between the transmitter and receiver.

Furthermore, the random phase shift circuit 22 can randomly shift the phases of the orthogonally converted transmission symbols S5 to increase the randomness of the symbols S5 in their width and phase directions. The transmission symbols S21 the phases of which have been randomly shifted are subjected to inverse fast Fourier transformation to modulate with 24 subcarriers, and are subjected to digital-to-analog conversion and frequency conversion by the transmission circuit 6. The symbols are thus amplified into the transmission signal S23 of the predetermined frequency channel, and transmitted.

Since the transmission symbols undergo not only random phase shift but also orthogonal conversion, the constellation points of the reception signal cannot be increased only in the phase direction by means of the random phase offset value but also in the amplitude direction. The resistance to the obstructive interference can be increased by regarding the interference waves as the noise component. In addition, in this case, as the two transmitted symbols have the equal power, the detection effect in the receiver is same as before undergoing the orthogonal conversion.

On the other hand, on receiving a transmission signal, the receiver amplifies said signal as the reception signal S25, and then converts the frequency of this signal S25 to obtain a baseband signal. The receiver then executes analog-to-digital conversion to obtain the reception signal S26. The reception symbols are output on the time axis by fast Fourier transformation. The reception signal S28 recovers their phases to the original state by random reverse phase shift, and is output to the orthogonal conversion circuit 34.

The orthogonal conversion circuit 34 reversely orthogonally converts a half of the reception symbols orthogonally converted by the transmitter, under the control of the on/off controller 40B. The resulting signal sequence is differentially demodulated by the DQPSK demodulation circuit 36A of the demodulation circuit 35.

Thus, by differentially demodulating the reception signal S29, the effect of a phase offset can be canceled that could occur in the reception symbols when the orthogonally converted transmission signals are distributed to and superimposed into each subcarrier.

Furthermore, the demodulating circuit 35 uses the weighting circuit 36B to calculate a noise power S66 in one slot, and extracts a signal power S69 of the desired signal from the signal power S68 in one slot, and generates a signal-to-noise power ratio from the inverse of the signal power S69 and noise power S66. Then, this ratio can be multiplied as the weight coefficient S71 by each reception symbol S30 input from the orthogonal conversion circuit 34 in order to generate the reception symbol S31A reflecting the reliability of the slot in the amplitude of the reception symbol S30.

In this case, since the noise power S66 contained in the reception signal S29 is generated based on the transmission signal S23 that has undergone orthogonal transformation and random phase shift in the transmission apparatus 20, the randomization serves to significantly increase the constellation points of the reception signal, thereby increasing the component of the interference waves which can be regarded as the noise power component. As a result, the noise component generated by interference waves can be accurately detected from the signal components of the reception signal S29 for each interleaved slot.

Furthermore, the detected noise component (the noise power S66) can be used to generate the weight coefficient S71 reflecting the reliability of each slot that is interleaved, and the weight coefficient S71 can be multiplied by the demodulated reception signal S30 to substantially increase the communication quality of each slot in the reception signal S30.

In addition, the demodulating circuit 35 sorts a signal sequence that has not been orthogonally converted out from the reception signal S29, in response to the symbol conversion information S75 sent out by the on/off controller 40B of the orthogonal conversion circuit 34, and generates the average S76 of the phase components of the signal sequence. This configuration enables the average of phase offsets in the transmission symbols S23 to be accurately detected from the reception symbols that have not been orthogonally converted. Furthermore, the average S76 of the phase components can be multiplied by the reception symbols S30 with the multiplier 53 to accurately cancel the phase offset in the reception signal.

In this case, since the orthogonal conversion circuit 21 of the transmission apparatus 20 orthogonally converts only half the transmission symbols in one slot, a phase offset caused on the frequency axis by a timing offset in windowing provided during inverse Fourier transformation executed by the inverse Fourier transformation circuit 23 or caused by large received power in a wave delayed due to multiple paths, can be accurately detected for each slot that is interleaved using those transmission symbols which have not been orthogonally converted. Furthermore, since only half the transmission symbols in each slot are orthogonally converted, the transmission symbols are prevented from being degraded due to the phase offset. This feature can reduce the effect of the phase offset in the reception signal S25 during the demodulation of the reception signal S25.

Furthermore, the demodulation circuit 35 can multiply the reception signal S31A by the inverse of the signal power S68 in one slot to normalize the reception symbols S31 for demodulation.

Figure 12:
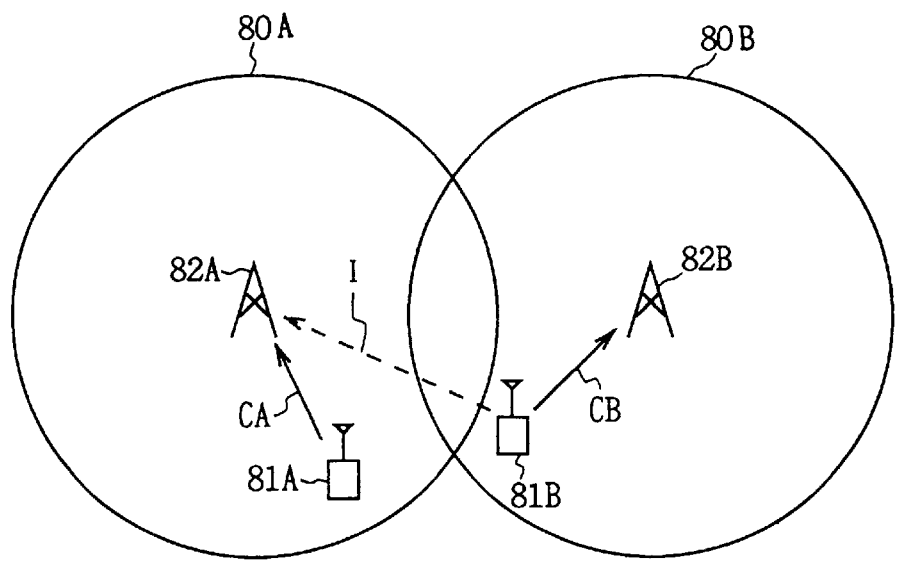
FIG. 12 is a schematic diagram describing a configuration of a cellular radio communication system and interference waves.

As shown in FIG. 12, in a cellular radio communication system having portable transceivers and base stations to which this invention is applied, it is assumed that in a cell 80A, a cellular telephone 81A radio-communicates with a base station 82A using a predetermined channel, while in an adjacent cell 80B, a cellular telephone 81B radiocommunicates with a base station 82B using the same channel.

For example, the cellular telephone 81A orthogonally converts a part of a signal sequence for transmission, and transmits this orthogonally converted signal sequence.

In addition, the cellular telephone 81B orthogonally converts a signal sequence for transmission using a combination pattern different from that of the cellular telephone 81A, and transmits this orthogonally converted signal sequence.

In this case, if the base station 82A receives a transmission signal CA from the cellular telephone 81A acting as a transmitter, the reception apparatus 30 of the cellular telephone 81A uses the orthogonal conversion circuit 34 to reversely orthogonally convert the signal sequence which has been orthogonally converted by the transmitter out of the signal sequence received based on a converted-symbol-sequence combination pattern predetermined between the telephone and the base station 82A, under the control of the on/off controller 40B. Thus, the original signal sequence can be accurately recovered, and the transmission data transmitted by the cellular telephone 81A can be accurately recovered by using DQPSK demodulation.

The base station 82A receives not only the transmission signal CA transmitted by the cellular telephone 81A but also a transmission signal CB transmitted by the cellular telephone 81B. In this case, the transmission signal CB from the cellular telephone 81B acts as an interference wave I, and interferes with communication with the cellular telephone 81A if its signal level is higher than that of the transmission signal CA from the cellular telephone 81A. In this case, since the base station 82A cannot determine whether the signal has been transmitted from the cellular telephone 81A or 80B, it could mistakenly receive the transmission signal CB from the cellular telephone 81B.

On the contrary, on case the base station 82A receives the transmission signal CB from the cellular telephone 81B, even if the received signal sequence is orthogonally converted based on the converted-symbol combination pattern for the base station 82A, the transmission signal CB from the cellular telephone 81B cannot be recovered to its original state when a different converted symbol combination pattern is used between the base station 82A and the cellular telephone 81A. That is, if each symbol in the transmission signal sequence from the cellular telephone 81B is reversely orthogonally converted based on the converted-symbol combination pattern, and then unless the same converted-symbol combination pattern is used in both base stations 82A and 81B, those symbols which have not been orthogonally converted should be reversely orthogonally converted to further randomized signal sequence, thereby making it appear like a noise signal to prevent the original transmission data from being recovered even through undergoing DQPSK demodulation.

Thus, in a radio communication system to which this invention is applied, the transmitter multiplies an orthogonal matrix by a signal sequence based on a combination pattern for the orthogonal conversion of symbols in a slot which is set differently among the other base stations to transmit. And the receiver sorts out those symbols in the received signal sequence which have been orthogonally converted by the transmitter (in this case, a telephone that communicating with said base station) based on the converted-symbol combination pattern, and multiplies the symbols by a reverse orthogonal matrix to recover the original signal sequence before executed the orthogonal conversion. Thus, even if the same channel is used by another base station for communication, the converted-symbol combination pattern of this base station has a different combination of subcarriers in a slot that are orthogonally converted during transmission, so that this base station cannot reversely orthogonally convert those reception signals which have not been orthogonally converted, and thus, the signal sequences transmitted by other base stations cannot be recovered. This feature prevents signal sequences sent from other base stations from being mistakenly recovered, so as to avoid in advance, the leakage of transmission data in other communications.

Although it has been stated that leakage problems can be avoided when the base station 82A receives the transmission signal CB from the cellular telephone 81B, the leakage problem can be avoided also when the base station 82B receives the transmission signal CA from the cellular telephone 81A as described above.

In addition, by executing the above described signal processing procedure while carrying out frequency hopping that varies a frequency band used for transmission and reception for each slot, the receiver can substantially vary the SINR (Signal to Interference Noise Ratio) of each slot to further appropriately enable interference waves to be identified as noise. In particular, in such a cellular radio communication system, the receiver can treat interference with the same channel from different cellular devices as noise, and provide desired weighting to increase the capacity of the radio communication system.

Thus, according to the above described configuration, the transmitter orthogonally converts some of the transmission symbols based on the orthogonal-conversion symbol combination pattern set for each base station, and randomly shifts the phases of the resultant transmission symbols, applies inverse Fourier transformation to assign the symbols to each of 24 subcarriers for multicarrier transmission. The reception apparatus 30 in the receiver can apply random phase reverse shift and orthogonal conversion to the received signal symbols in order to increase the magnitude of the noise component in an interference wave toward to a desired signal wave, thereby enabling the weighting circuit 36B to accurately extract a noise of the interference wave to generate an accurate weighting coefficient when the DQPSK demodulation circuit 35 carries out DQPSK demodulation. Thus, as this weighting coefficient is reflected on a signal for maximum likelihood sequence estimation, the reliability of each slot in the reception signal can be improved to achieve very accurate soft-decision maximum likelihood sequence estimation.

Furthermore, since only a half of the transmission symbols in each slot are orthogonally converted during demodulation, the demodulating circuit 35 can sort out those reception signals which have not been orthogonally converted so as to accurately detect the phase offset of each symbol in the sorted reception signals, and can use the average of the phase offsets of the detected symbols to apply complex calculation to the reception signals so as to eliminate the phase offset of each slot in the interleaved reception signals. Thus, if the timing is off during multicarrier modulation and/or demodulation, the phase offset in the reception signal can be eliminated for each slot to accurately demodulate the reception signal.

Furthermore, for example, half of the symbols are orthogonally converted and a different pattern is randomly set for by each station. Thus, although only half of the symbols in the slot are orthogonally converted, a converted-symbol setting pattern different from that of a desired wave or a reception timing offset, causes the orthogonally converted symbols in each slot to be displaced so as to make more than half of the symbols in the slot appear to have been orthogonally converted.

In addition, the orthogonal conversion circuit 34 of the reception apparatus 30 multiplies a reverse matrix to the orthogonal matrix used at the transmitter by only the symbol sequence that has been orthogonally converted based on the symbol conversion information S75, so as to recover the original signal sequence before executed the orthogonal conversion. Thus, even if a signal from a different communication transmitted with the same channel is received, the signal sequence transmitted in this communication can be prevented from being recovered to avoid the leakage of transmission data sent in different communications.

Figure 13:
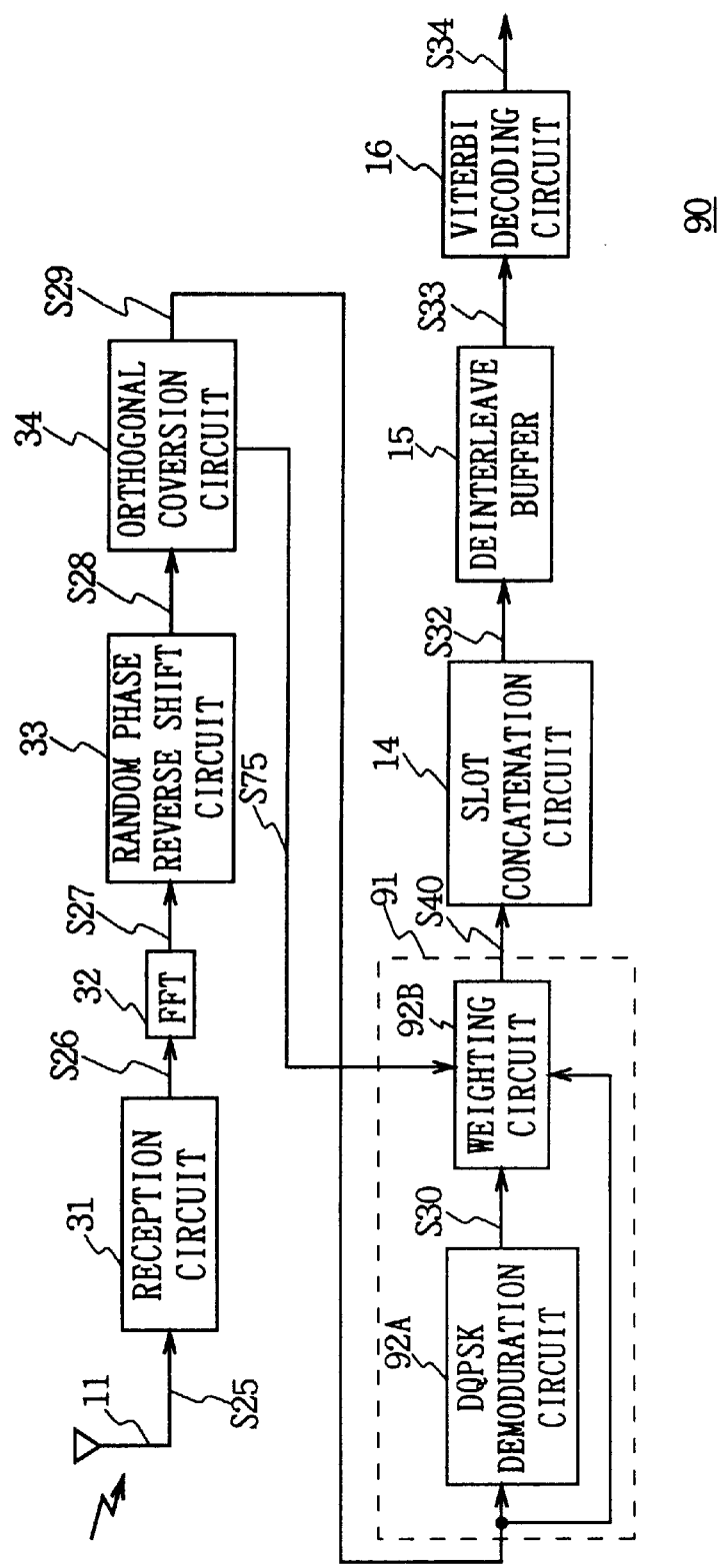
FIG. 13 is a block diagram showing a configuration of a reception apparatus according to a second embodiment of this invention.
Figure 14:
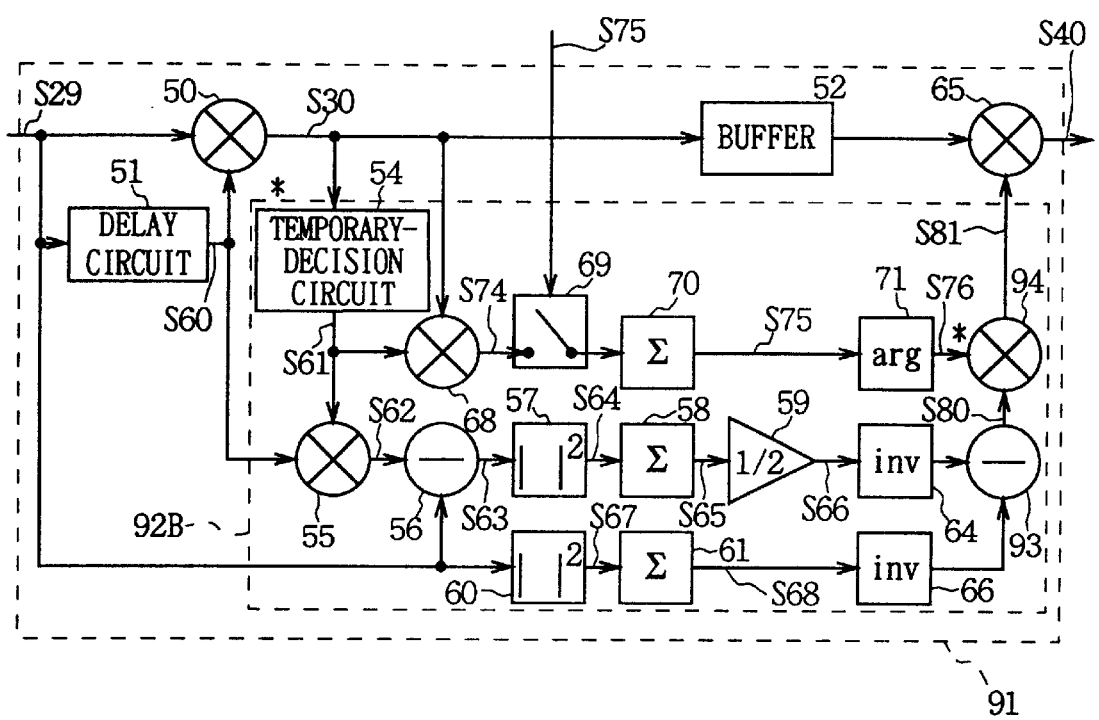
FIG. 14 is a circuit diagram showing a configuration of a demodulation circuit in the reception apparatus according to the second embodiment.

In FIG. 13, in which the same components have the same reference numerals as in FIG. 5, 90 as a whole designates a reception apparatus according to a second embodiment which differs from the reception apparatus according to the first embodiment only in the configuration of a demodulation circuit 91. As shown in FIG. 14 in which the same components have the same reference numerals as in FIG. 11, the demodulation circuit 91 inputs the complex reception signal S29 supplied from the orthogonal conversion circuit 34, to the multiplier 50 and delay circuit 51 constituting the DQPSK demodulating circuit 92A.

The multiplier 50 receives the reception signal S60 that has been delayed by one symbol by the delay circuit 51. The multiplier 50 complex-multiplies the input reception signal S29 by the conjugate value of the reception signal S60 that precedes the first reception signal S60 in order to extract the reception symbols S30 from the reception signal S29. However, the reception symbols S30 extracted by this multiplication are symbol information that has been DQPSK-modulated. The reception symbols S30 are input to the subsequent the FIFO buffer 52, where they are sequentially stored. The FIFO buffer 52 holds the reception symbols S30 until an amount of symbols S30 have accumulated up to one slot, and after that, outputs the group of symbols S30 to the subsequent multiplier 65.

The demodulation circuit 91 generates the noise power S66 obtained by using the half circuit 59 to reduce the signal power of the noise power S65 in all the symbols constituting one slot which is obtained by accumulative additions with the first addition circuit 58, and then outputs the noise power S65 to the subtractor 93 via an inverse calculation circuit 64.

On the other hand, the signal power S68 which is obtained by adding the power in the noise component and the power in the actual signal component in one slot in the reception signal S29 supplied from the random phase reverse shift circuit 33 which is generated by accumulative additions with the second addition circuit 61, is output to the subtractor 93 via the inverse calculation circuit 66. As a result, the subtractor 93 subtracts the noise power S66 from the signal power S68 to generate a value such as shown in the following equation in which the signal to noise power ratio (SNR) for one slot is multiplied by the inverse sum of the signal and noise power.

$$(S/N)/(S+N) = S/N(S+N) \qquad (5)$$

This value is output to a multiplier 94 as a weighting coefficient S80 indicating the reliability of one slot.

The average S76 of the phase components holding the phases of the reception symbols S29 in complex values which is supplied from the arg 71 and having an amplitude of "1", is also input to the multiplier 94. The multiplier 94 multiplies the weighting coefficient S80 indicating the reliability of one slot by the average S76 of the phase components in the reception symbols S29, and outputs the resultant weighting coefficient S81 to the multiplier 65.

The multiplier 65 multiplies the average S76 by the reception symbols S30 output from the FIFO buffer 52 in order to generate a reception signal S40 by this multiplication with the conjugation of the reception symbols S30. Thus, the demodulation circuit 91 with using the simplified configuration for weighting with the signal to noise power ratio (SNR) can minimize the entire size of the circuit, generate the reception symbols S40 reflecting the reliability of the slot, and detect the phase offset in the reception symbols to eliminate it.

Thus, according to the above described configuration, the reception symbols S40 output to the slot concatenation circuit 14 from the demodulation circuit 91 are weighted in response to the reliability of the reception slot, with using the signal to noise power ratio (SNR) generated by the simple circuit configuration. Furthermore, if there is any phase offset, the phase offset is eliminated by using the average S76 of the phase components in all the reception symbols in one slot, thereby the accuracy in maximum likelihood sequence estimation provided by the subsequent Viterbi decoding circuit 16 can be further improved.

Although the above described embodiments set different orthogonally-converted-symbol combination patterns for each base stations in a cellular radio communication system, this invention is not limited only to this aspect, but a specific converted-symbol combination pattern may be set for each communication channel. Furthermore, different converted-symbol combination patterns may be set for each slots. Thereby, a specific converted-symbol combination pattern can be arranged for each communication to differentiate each communication, so that the same effects are achieved as described above.

In addition, in the above described embodiments, the ratio of those symbols in each slot which are orthogonally converted to those symbols which are not orthogonally converted is set at 1 to 1 (according to the first embodiment, the number of the symbols in each group is 12). However, this invention is not limited to this aspect, but can also apply to a case where this ratio is set at various values such as 1 to 2, 2 to 3, and 1 to 4.

In addition, the above described embodiments have been described in conjunction with the normalized orthogonal matrix. Houever, this invention is not limited to this aspect, but can also employ an arbitrary orthogonal matrix which is not normalized. Whatever orthogonal matrix is employed, the same effects can be provided as long as an orthogonal matrix is employed to orthogonally convert the signal sequence.

In addition, the above described embodiments perform frequency hopping, that is, randomly varies the frequency channel based on the known pattern. However, this invention is not limited to this aspect, but can apply also to a case where the frequency channel may be fixed as long as the environment is prevented from being affected by interference waves.

In addition, the above described embodiments normalize power by allowing the weighting circuit 36B to multiply the reception signal S31A consisting of a codedbit sequence by the inverse value S73 determined via the square circuit 60, accumulative addition circuit 61, and inverse calculation circuit 66. However, this invention is not limited to this aspect, but can be applied also to a case where this normalization is omitted.

In the above described embodiments, the weighting circuit 36B determines the signal to noise power ratio S/N based on the sums of noise and signal power in one slot. However, this invention is not limited to this aspect, but can be applied also to a case where the signal to noise power ratio S/N is calculated based on the averages of noise and signal power in one slot. Thus, the same effects can be achieved.

In addition, the above described embodiments use the convolution coding circuit 2 as a coding circuit and the Viterbi decoding circuit 16 as a decoding circuit. However, this invention is not limited to this aspect, but also can be use different coding or decoding circuit which executes different coding such as turbo coding. The same effects can be provided as long as the transmitter uses coding that increases the intersequence distance while the receiver uses a coding/decoding method that decodes a coded bit sequence using maximum likelihood sequence estimation for decoding.

In addition, the above described embodiments apply this invention to the radio communication system 20 such as a cellular telephone system. However, this invention is not limited to this aspect, but can be applied also to other radio communication systems, for example, codeless telephone systems.

In addition, the above described embodiments use DQPSK modulation as a method for modulating transmission data. However, this invention is not limited to this aspect, but also can use other differential modulation methods, for example, differential twophase phase deviation modulation. Thus, the demodulation circuit 35 or 91 can accurately detect phase offsets without accumulation by using the differential among continuously received reception symbols so as to eliminate the phase offsets.

Furthermore, the above described embodiments apply this invention to a radio communication system with using a communication method of distributing a signal sequence to a plurality of multicarriers for superimposing, converting the frequency of the resultant transmission signal into a predetermined channel to transmit, and randomly varying the channel of the transmission signal at each predetermined timing. However, this invention is not limited to this aspect, but is also applicable to a radio communication system with using other communication method. This invention can allow interference waves to be treated as noise as long as co-channel interference may occur in which when at least two communications are executed using the same channel, the electric waves of the communications mutually interfere.

As described above, a transmitter sorts out a part of a signal sequence, and orthogonally converts this part based on a predetermined combination pattern set between the transmitter and a receiver, transmit the signal sequence through a predetermined channel in an information unit. The receiver receives the signal sequence in the information unit through the same channel, and reversely orthogonally converts only the part of the signal sequence that has been orthogonally converted by the transmitter corresponding to the combination pattern so as to recover the signal sequence. This configuration provides a communication method, transmission and a reception apparatuses, and a cellular radio communication system, in which waves interfering with the desired wave from the communication partner can be accurately treated as noise, and in which if other communications use the same channel, the leakage of communication can be avoided.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication method wherein a frequency channel is divided into a plurality of frames, each frame having a plurality of slots and each of said slots having a plurality of symbols transmitted at once, the method comprising the steps of:

at a transmitter selecting only a part of said plurality of symbols included in each of said slots in said frame based on a predetermined combination pattern set between a transmitter and a receiver, and orthogonally converting only said selected part of said plurality of symbols before transmitting said orthogonally converted symbols and symbols which are not orthogonally converted in each of said slots at once through a predetermined frequency channel; and at said receiver receiving said transmitted slots in said frame through said predetermined frequency channel and reverse orthogonally converting only said selected symbols of each of said transmitted slots based on said predetermined combination pattern in order to recover said symbols present before orthogonal conversion of said selected part.

2. The communication method according to claim 1, wherein:

said transmitter codes said signal sequence before transmitting said signal sequence in said information unit;

said receiver generates a weight coefficient indicating a reliability of said transmission based on said signal sequence recovered through said reverse orthogonal conversion and multiplies said weight coefficient with said recovered signal sequence; and said receiver applies maximum likelihood sequence estimation to said recovered signal sequence based on said reliability.

3. The communication method according to claim 1, wherein said weight coefficient is obtained by calculating a signal power of a group of information symbols in said information unit and a noise power of said group of information symbols in said information unit and then by calculating a signal-to-noise power ratio in said information unit based on said signal power and said noise power.

4. A communication method wherein a frequency channel is divided into a plurality of frames, each frame having a plurality of slots and each of said slots having a plurality of symbols transmitted at once, the method comprising the steps of:

at a transmitter applying a predetermined modulation to a signal sequence in an information unit to generate a group of information symbols, selecting only a part of said group of information symbols included in each of said slots in said frame based on a predetermined combination pattern set between said transmitter and a receiver, orthogonally converting only said selected part of said group of information symbols, and modulating each orthogonally converted information symbol of said selected part using a plurality of subcarriers forming a frequency channel before performing multicarrier transmission; wherein, the multicarrier transmission comprises transmitting the orthogonally converted information symbols and symbols which are not orthogonally converted; and at said receiver executing orthogonal conversion on said selected part based on said predetermined combination pattern, selecting received information symbols that have not been orthogonally converted in order to calculate phase component information of said information symbols, and multiplying said phase component information with each of said group of information symbols to remove a phase offset that may occur in each of said information symbols.

5. The communication method according to claim 4, wherein said receiver generates a weight coefficient indicating a reliability of said transmission based on a result of said orthogonal conversion at said receiver and multiplies said phase component information with each of said group of information symbols according to a value of said weight coefficient.

6. The communication method according to claim 4, wherein said weight coefficient is obtained by calculating a signal power of said group of information symbols in said information unit and a noise power of said group of information symbols in said information unit and then by calculating a signal-to-noise power ratio in said information unit based on said signal power and said noise power.

7. The communication method according to claim 4, wherein:

said transmitter uses a random phase value to randomly shift a phase of said signal sequence for each of a plurality of communication channels; and said receiver reversely shifts a phase of a received signal sequence using said random phase value as used by said transmitter.

8. A transmission apparatus wherein a frequency channel is divided into a plurality of frames, each frame having a plurality of slots and each of said slots having a plurality of symbols transmitted at once comprising:

an orthogonal conversion control section for selecting only a part of said plurality of symbols included in each of said slots in said frame based on a predetermined combination pattern set between a transmitter and a receiver;

an orthogonal conversion section for orthogonally converting only a part of said plurality of symbols selected under control of said orthogonal conversion control section; and a transmission section for transmitting said orthogonally converted symbols and symbols which are not orthogonally converted in each of said slots at once through a predetermined channel in said information unit.

9. A transmission apparatus wherein a frequency channel is divided into a plurality of frames, each frame having a plurality of slots and each of said slots having a plurality of symbols transmitted at once comprising:

an information symbol generating section for applying a predetermined modulation to a signal sequence which can be transmitted at once in an information unit;

an orthogonal conversion section for selecting only a part of an entire group of information symbols included in each of said slots in said frame based on a predetermined combination pattern set between a transmitter and a receiver and orthogonally converting only a selected part; and a transmission section for modulating each orthogonally converted information symbol using a plurality of subcarriers forming a frequency channel before executing multicarrier transmission.

10. The transmission apparatus according to claim 9, further comprising phase shift means operative in said transmitter for randomly shifting a phase of said signal sequence for each communication channel.

11. A reception apparatus wherein a frequency channel is divided into a plurality of frames, each frame having a plurality of slots and each of said slots having a plurality of symbols transmitted at once comprising:

a reception section for receiving a transmitted said plurality of symbols included in each of said slots in said frame which was transmitted at once from a transmitter, part of said transmitted plurality of symbols having been orthogonally converted by said transmitter based on a predetermined combination pattern set between said transmitter and a receiver, said transmitted plurality of symbols having been transmitted by said transmitter through a predetermined frequency channel in an information unit; and a reverse orthogonal conversion section for performing reverse orthogonal conversion on only said part of said transmitted plurality of symbols that was orthogonally converted by said transmitter and that corresponds to said combination pattern in order to recover a plurality of symbols present before orthogonal conversion by said transmitter.

12. The reception apparatus according to claim 11.

wherein said transmitted signal sequence received by said reception section has been coded by said transmitter transmitting said signal sequence in said information unit, and further comprising:

a weight coefficient generating section for generating a weight coefficient indicating a reliability of said transmission based on said signal sequence recovered by said reverse orthogonal conversion section;

a multiplying section for multiplying said weight coefficient with said signal sequence to produce a signal sequence reflecting said reliability; and a recovering section for applying maximum likelihood sequence estimation to said signal sequence reflecting said reliability.

13. The reception apparatus according to claim 12, wherein said weight coefficient generating section obtains said weight coefficient by calculating a signal power of a group of information symbols in said information unit and a noise power of said group of information symbols in said information unit and then by calculating a signal-to-noise power ratio in said information unit based on said signal power and said noise power.

14. A reception apparatus wherein a frequency channel is divided into a plurality of frames, each frame having a plurality of slots and each of said slots having a plurality of symbols transmitted at once comprising:
- a reception section for receiving information symbols included in each of said slots in said frame that have been obtained by a transmitter applying a predetermined modulation to a signal sequence which was transmitted at once, in an information unit to generate said information symbols, orthogonally converting only those of said information symbols which have been selected by said transmitter based on a predetermined combination pattern set between said transmitter and a receiver, and modulating each of said orthogonally converted information symbols using a plurality of subcarriers forming a frequency channel before multicarrier transmission;
- a phase component calculating section for selecting those of said information symbols received by said reception section which have not been orthogonally converted and calculating phase component information of said information symbols; and
- a phase offset removing section for multiplying said phase component information with said information symbols before multicarrier transmission of said information symbols to remove a phase offset that may occur in each of said information symbols.

15. The reception apparatus according to claim 14, further comprising:
- a weight coefficient generating section for generating a weight coefficient indicating a reliability of said transmission based on a signal sequence recovered through orthogonal conversion; and
- a multiplying section for multiplying said phase component information with each of said information symbols according to a value of said weight coefficient.

16. The reception apparatus according to claim 15, wherein said weight coefficient generating section obtains said weight coefficient by calculating a signal power of said information symbols in said information unit and a noise power of said information symbols in said information unit and then by calculating a signal-to-noise power ratio in said information unit based on said signal power and said noise power.

17. The reception apparatus according to claim 14, further comprising reverse phase shift means operative in said receiver for reversely shifting a phase of a received signal sequence using a random phase value used in said transmitter.

18. A cellular radio communication system wherein a frequency channel is divided into a plurality of frames, each frame having a plurality of slots and each of said slots having a plurality of symbols transmitted at once,
wherein a predetermined area is divided into cells of a desired size, each of which is provided with a base station, and
wherein a mobile station directly communicates with said base station in a cell which said mobile station is present, comprising:
- first means for operating on said plurality of symbols included in each of said slots which can be transmitted at once such that only a part of said plurality of symbols transmitted from said base station on a transmitter side to said mobile station in a predetermined information unit which has been selected based on a conversion symbol combination pattern set between said base and mobile stations is orthogonally converted before said plurality of symbols are transmitted through a predetermined frequency channel in said information unit; and
- second means for operating on said plurality of symbols such that a part of said plurality of symbols received by said mobile station on a receiver side through said frequency channels in said information unit which has been selected based on said combination pattern set between said base and mobile stations undergoes reverse orthogonal conversion in order to recover an original sequence.

19. A cellular radio communication system wherein a frequency channel is divided into a plurality of frames, each frame having a plurality of slots and each of said slots having a plurality of symbols transmitted at once, wherein a predetermined area is divided into cells of a desired size, each of said cells being provided with a base station, and wherein a mobile station directly communicates with said base station in a cell in which said mobile station is present, comprising:
- first means for operating on said plurality of symbols included in each of said slots in said frame which can be transmitted at once such that only a part of said plurality of symbols transmitted from said mobile station on a transmitter side to said base station in a predetermined information unit which has been selected based on a conversion symbol combination pattern set between said base and mobile stations is orthogonally converted before said plurality of symbols is transmitted through a predetermined frequency channel in said information unit; and
- second means for operating on said plurality of symbols such that a part of said plurality of symbols received by said base station on a receiver side through channels in said information unit which has been selected based on said combination pattern set between said base and mobile stations undergoes reverse orthogonal conversion in order to recover an original sequence.

20. A communication method where frequency channels are divided into a plurality of frames, each frame having a plurality of slots and each of said slots having a plurality of symbols transmitted at once, the method comprising the steps of:
- at a transmitter selecting only a part of said plurality of symbols included in each of said slots in said frame based on a predetermined combination pattern indicating at least part of said plurality of symbols is prohibited from being orthogonally converted set between a transmitter and a receiver and orthogonally converting only said selected symbols before transmitting said plurality of symbols through a predetermined frequency channel in said predetermined information unit; and
- at said receiver receiving said transmitted slots in said frame through said predetermined frequency channel and reverse orthogonally converting only said selected symbols of each of said transmitted slots based on said predetermined combination pattern in order to recover said symbols present before orthogonal conversion of said selected part.

21. A transmission apparatus where frequency channels are divided into a plurality of frames, each frame having a plurality of slots and each of said slots having a plurality of symbols transmitted at once comprising:

an information signal generating section for applying a predetermined modulation to a signal sequence in an information unit;

an orthogonal conversion section for selecting only a part of an entire group of information symbols based on a predetermined combination pattern indicating at least part of said information unit is prohibited from being orthogonally converted set between a transmitter and a receiver and orthogonally converting only a selected part; and a transmission section for modulating each orthogonally converted information symbol using a plurality of subcarriers forming a frequency channel before executing multicarrier transmission.

* * * * *